United States Patent [19]

Lotsch et al.

[11] Patent Number: 4,480,097
[45] Date of Patent: Oct. 30, 1984

[54] ISOINDOLINE COLORANTS

[75] Inventors: Wolfgang Lotsch, Beindersheim; Reinhard Kemper, Heidelberg, both of Fed. Rep. of Germany

[73] Assignee: BASF Aktiengesellschaft, Ludwigshafen, Fed. Rep. of Germany

[21] Appl. No.: 228,624

[22] Filed: Jan. 26, 1981

[30] Foreign Application Priority Data

Feb. 27, 1980 [DE] Fed. Rep. of Germany ....... 3007300

[51] Int. Cl.$^3$ ........................................... C07D 239/36
[52] U.S. Cl. .................................. 544/296; 260/154; 106/287.2; 106/288 R; 106/288 Q
[58] Field of Search .......................................... 544/296

[56] References Cited

U.S. PATENT DOCUMENTS

| | | | |
|---|---|---|---|
| 3,499,906 | 3/1970 | Vollman et al. | 544/296 |
| 3,646,033 | 2/1972 | Leister et al. | 544/353 |
| 3,923,806 | 12/1975 | Bock et al. | 544/296 |
| 4,259,488 | 3/1981 | von der Crone | 544/296 |

Primary Examiner—Richard L. Raymond
Assistant Examiner—James H. Turnipseed
Attorney, Agent, or Firm—Oblon, Fisher, Spivak, McClelland & Maier

[57] ABSTRACT

Isoindoline colorants of the formula

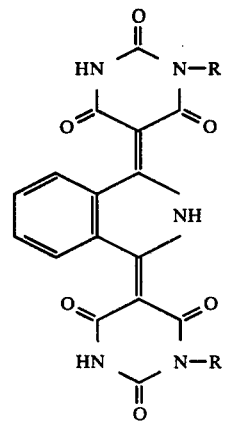

where the two R's independently of one another are $C_1$-$C_4$-alkyl, or are benzyl, phenyl or 1-naphthyl, each of which may be unsubstituted or substituted by groups which do not confer solubility.

The colorants give deep, yellow to orange, hues in plastics, surface coatings and printing inks. The colorations have very good lightfastness and fastness to weathering and to migration.

3 Claims, No Drawings

ISOINDOLINE COLORANTS

The present invention relates to novel isoindoline colorants and to their use.

The novel colorants have the general formula I

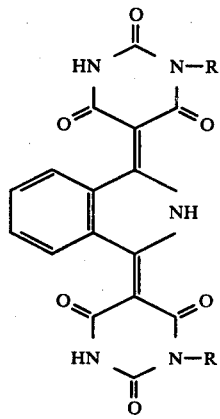

where the two R's independently of one another are $C_1$–$C_4$-alkyl, or are benzyl, phenyl or 1-naphthyl, each of which may be unsubstituted or substituted by groups which do not confer solubility.

The novel colorants (I) are pigments, which give deep yellow to orange hues in surface coatings, plastics and printing inks. The colorations have very good light-fastness and fastness to weathering and to migration.

The colorants (I), where R is $C_1$–$C_4$-alkyl, exhibit a higher tinctorial strength in white reductions than does the colorant of Example 1 of German Laid-Open Application DOS No. 2,041,999, which is to be regarded as the closest prior art. The colorants (I), where R is substituted phenyl or 1-naphthyl, show substantially less darkening-up of almost full-shade colorations, on exposure to light and weathering, than the colorant of DOS No. 2,041,999, Example 1.

For the purposes of the present invention, substituents which do not confer solubility are those which do not cause the colorant to be soluble either in water or in organic solvents. Examples of such substituents are halogen, alkyl or alkoxy, each of 1 to 6 carbon atoms, nitro, trifluoromethyl, carbamyl, ureido, sulfamyl and cyano; alkoxycarbonyl, alkanoyl, N-alkylcarbamyl, N-alkylureido and alkanoylamino, each of a total of 2 to 6 carbon atoms; alkylsulfonyl and alkylsulfamyl, each of 1 to 6 carbon atoms; aryloxycarbonyl, aroyl, aroylamino, arylsulfonyl, N-acylcarbamyl, N-arylsulfamyl, aryl, N-arylureido, arylazo and aryloxy, aryl being particularly phenyl, and fused-on 5-membered and 6-membered hetero-rings which contain a

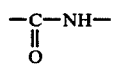

group in the ring.

Preferred substituents which do not confer solubility are chlorine, bromine, $C_1$–$C_4$-alkyl, $C_1$–$C_4$-alkoxy and phenoxy. The number of these substituents can be up to 2, but is preferably 0 or 1. Where 2 substituents are present, they may be identical or different.

Amongst the compounds of the formula I, preferred compounds, for tinctorial and technological reasons, are those of the formula II:

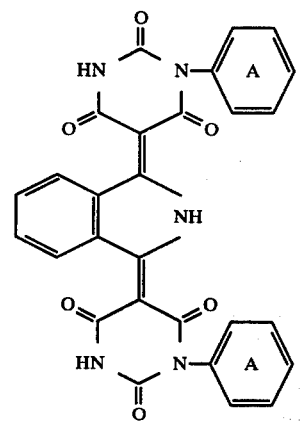

where the phenyl radicals A are unsubstituted or substituted by groups which do not confer solubility. Particularly preferred colorants of the formula II are those where the phenyl radicals A are unsubstituted, or are mono- or di-substituted by chlorine, bromine, $C_1$–$C_4$-alkyl or $C_1$–$C_4$-alkoxy, and, where 2 substituents are present, these may be identical or different.

Particularly preferred colorants are those of the formula III

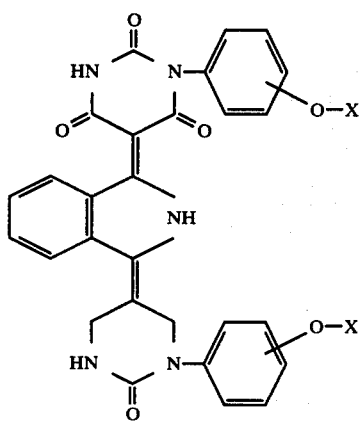

where X is $C_1$–$C_4$-alkyl, phenyl or naphthyl and the substituent —OX is in the 3- or 4-position.

The novel colorants are obtained by condensing one mole of a 1,3-diiminoisoindoline of the formula IV

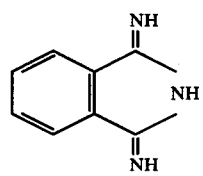

with 2 moles of a barbituric acid of the formula

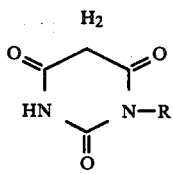

(V)

where R has the above meanings. If the substituents R in the colorant are to be different from one another, mixtures of barbituric acids (V) may be condensed with compound (IV).

The condensation of the diiminoisoindolines of the formula (IV) with the barbituric acid (V) can be carried out by the method of German Laid-Open Application DOS No. 2,628,409, in water or an organic solvent or diluent or a mixture of these. The condensation takes place particularly well in an aliphatic monocarboxylic or dicarboxylic acid, eg. formic acid, acetic acid or propionic acid or a mixture of these, and these solvents are therefore preferred. The amount of solvent used is not critical. The minimum amount is decided by the requirement that the reaction mixture should be stirrable. In general, the weight of solvent used is from 10 to 20 times the weight of barbituric acid employed.

The reaction is as a rule carried out at from 50° C. to 150° C., preferably from 70° C. to 120° C.

The products are isolated from the reaction mixture by filtration and can in general be employed direct as a pigment. However, the products can also be converted, by conventional finishing processes, into the optimum pigmentary form for the envisaged use.

The Examples which follow illustrate the invention. Parts and percentages are by weight.

EXAMPLE 1

(a) 140 parts of N-(4'-methoxyphenyl)-barbituric acid and 56 parts of the mono-adduct of ethylene glycol with 1,3-diiminoisoindoline, in 1,900 parts of glacial acetic acid, are heated for 2 hours at 110° C. The suspension is filtered hot and the filter residue is washed with glacial acetic acid and methanol and is dried. Yield: 144 parts of the colorant of the formula I, where R is

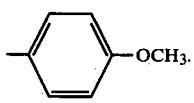

The product can be used direct as a pigment, for example in surface coatings or plastics. It gives pure orange colorations which have very good lightfastness and fastness to weathering and plasticizer.

(b) 10 parts of the colorant obtained as described in (a), in 55 parts of dimethylformamide, are stirred for 3 hours at 110° C. The colorant is then filtered off, washed with dimethylformamide and methanol and dried. Yield: 9 parts of colorant having the above structure. Compared to (a), the product gives colorations having improved fastness to weathering. Furthermore, the colorant has a higher hiding power than that of the product obtained according to (a).

EXAMPLES 2 TO 8

The procedure described in Example 1(a) is followed, but instead of N-(4'-methoxyphenyl)-barbituric acid, the equivalent amount of a barbituric acid of the formula (V), where R has the meanings given in the Table which follows, is used. The corresponding colorants of the formula I are obtained. In surface coatings, plastics and printing inks, the colorants give the hues shown in column 3.

| Example | R | Hue |
| --- | --- | --- |
| 2 | —⟨C₆H₄⟩—OC₂H₅ | orange |
| 3 | —⟨C₆H₄⟩—O—⟨C₆H₅⟩ | orange |
| 4 | —⟨C₆H₄⟩—OCH₃ (ortho) | orange |
| 5 | —⟨C₆H₄⟩—CH₃ | yellow |
| 6 | —⟨C₆H₄⟩—Cl | yellow |
| 7 | —⟨C₆H₅⟩ | yellow |
| 8 | 1-naphthyl | orange |

EXAMPLE 9

17 parts of sodium N-methylbarbiturate and 10 parts of the mono-adduct of ethylene glycol with 1,3-diiminoisoindoline, in 150 parts of glacial acetic acid, are stirred for 2 hours at room temperature and 3 hours at 90° C. The content is filtered off hot, washed with glacial acetic acid and methanol, and dried. Yield: 15 parts of colorant of the formula I, where R is —CH₃; the product can be used direct for pigmenting surface coatings and plastics. Very deep, pure neutral yellow colorations, having good lightfastness, are obtained.

EXAMPLE 10

The procedure described in Example 9 is followed, but instead of glacial acetic acid a solution of 120 parts of water, 10 parts of formic acid and 10 parts of the sodium salt of a C₃–C₄-alkylnaphthalenesulfonic acid is used, and the mixture is refluxed for 4 hours. 15 parts of the colorant of the formula I, where R is —CH₃, are obtained in a pigmentary form having particularly high hiding power.

EXAMPLES 11 TO 14

The procedure described in Example 9 or 10 is followed, but employing a barbituric acid of the formula (V), where R has the meanings given in column 2 of the Table which follows. The corresponding colorants of the formula I are obtained, and these give colorations in the hues shown in column 3. In tinctorial and technological properties, the colorants virtually correspond to those obtained as described in Examples 9 and 10.

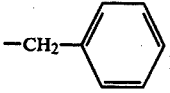

| Example | R | Hue |
| --- | --- | --- |
| 11 | —C$_2$H$_5$ | neutral yellow |
| 12 | —C$_3$H$_7$ | neutral yellow |
| 13 | —C$_4$H$_9$(n) | neutral yellow |
| 14 | —CH$_2$—C$_6$H$_5$ | neutral yellow |

EXAMPLE 15 (USE EXAMPLE)

(a) Finish 10 parts of the colorant obtained as described in Example 1 and 95 parts of a baking finish mixture which contains 70% of coconut alkyd resin (60% strength solution in xylene) and 30% of melamine resin (about 55strength solution in butanol/xylene), are ground in an attrition mill. After applying the finish and baking it for 30 minutes at 120° C., orange full-shade coatings having good lightfastness and fastness to overspraying are obtained. If titanium dioxide is added to the formulation, orange white reductions are obtained.

If the colorants of Examples 2 to 14 are used, coatings in similar hues, and having similar properties, are obtained.

(b) Plastic 0.5 part of the colorant obtained as described in Example 1 is tumbled with 100 parts of polystyrene granules (standard type). The dry-colored granules obtained are homogenized by extrusion at 190°–195° C. Orange extrudates, in which the coloration has good lightfastness, are obtained.

If mixtures of 0.5 part of colorant and 1 part of titanium dioxide are used, high-hiding orange colorations are obtained.

Similar colorations are obtained with the pigments of Examples 2 to 14.

(c) Printing ink 8 parts of the pigment obtained as described in Example 1, 40 parts of a phenol/formaldehyde-modified rosin and 55–65 parts of toluene are mixed thoroughly in a dispenser. An orange toluene-based gravure ink is obtained, which gives very lightfast prints.

Similar results are obtained with the colorants of Examples 2 to 14.

We claim:

1. An isoindoline colorant of the formula

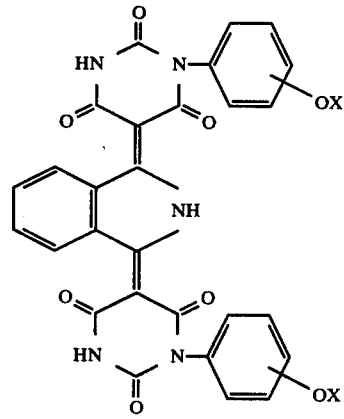

where X is C$_1$–C$_4$-alkyl and the OX radical is in the 3- or 4-position.

2. The colorant of claim 1, wherein X is methyl or ethyl.

3. The colorant of claim 1, wherein X is methyl or ethyl and the OX radical is in the 4-position.

* * * * *